H. B. Cooper,

Bee Hive.

No. 100,015.    Patented Feb. 22, 1870.

Witnesses:

Inventor:
H. B. Cooper

H. B. Cooper.
Bee Hive.
No. 100,015. Patented Feb. 22, 1870.

Witnesses:
J. Preston Henry
Jno. H. Fisher.

Inventor:
Henry B. Cooper

United States Patent Office.

H. B. COOPER, OF MEMPHIS, TENNESSEE.

Letters Patent No. 100,015, dated February 22, 1870.

IMPROVEMENT IN BEE-HIVES.

The Schedule referred to in these Letters Patent and making part of the same.

Be it known that I, H. B. COOPER, of Memphis, in the county of Shelby, and State of Tennessee, have invented a new and useful Bee-Hive for the better preservation of the bees from the ravages of moths, and the more convenient renewing of the comb after it has become old and damaged; and I do hereby declare that the following is a full, clear, and exact description of the construction and operation of the same, reference being had to the annexed drawings making a part of this specification, in which—

Figure 1:
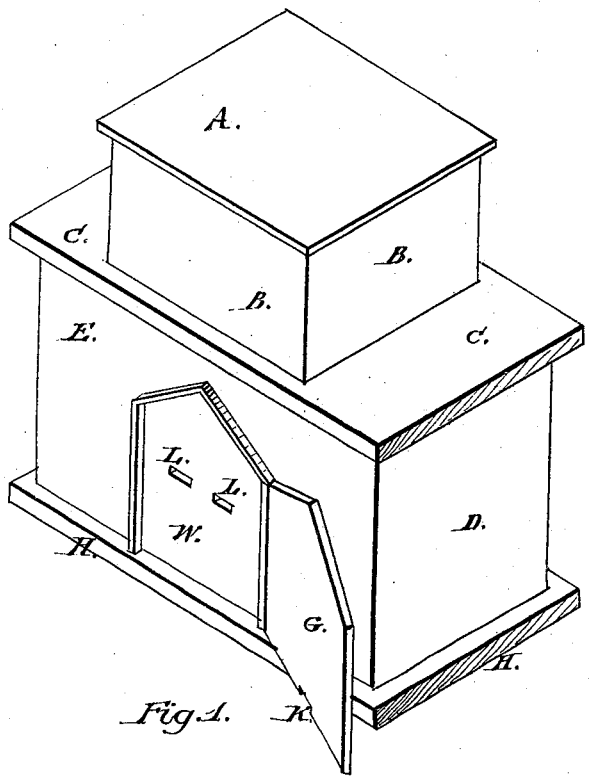

Figure 1 is a perspective elevation.

Figure 2:
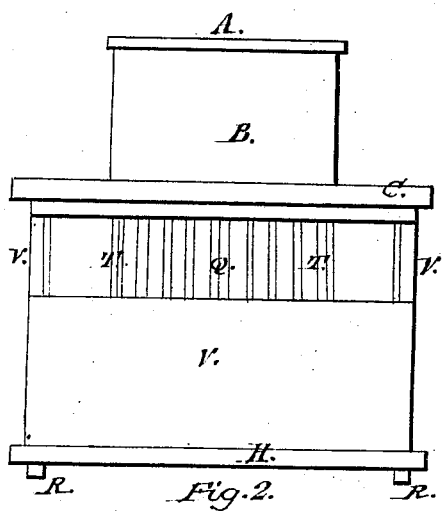

Figure 2, an elevation of rear of hive.

Figure 3:
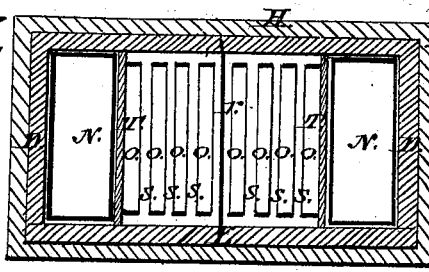

Figure 3, plan with top cover removed, showing position of honey-boxes and honey-frames.

Figure 4:
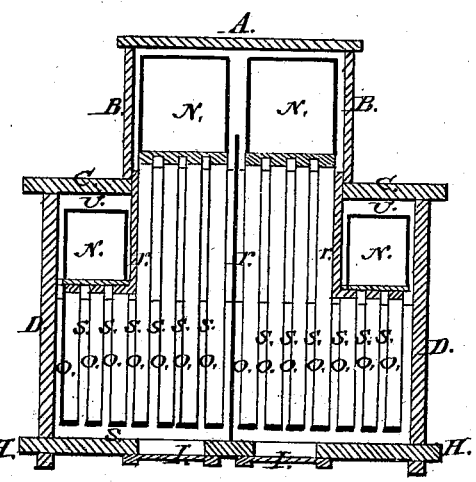

Figure 4, lateral section, showing position of honey-boxes and frames.

Figure 5:
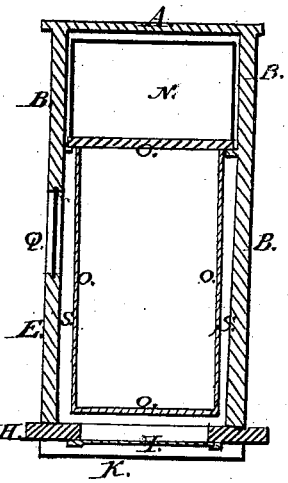

Figure 5, transverse section, showing position of honey-box and frames.

Figure 6:
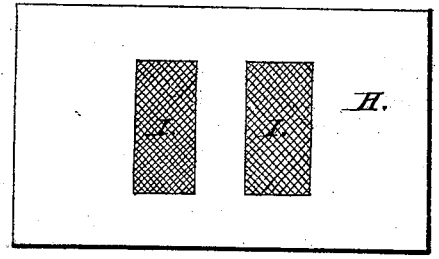

Figure 6, plan of bottom of hive, showing position of tin ventilators.

Figs. 3 and 4 also show the position of movable tin separator.

My invention consists of an ordinary rectangular box-hive, twenty-four inches in length, fifteen and a half inches deep, and twelve and a half inches wide.

The bottom is perforated with two holes four by eight inches each, fig. 6, I I, for the insertion of perforated tin ventilators.

A square hole is cut in center of top of hive, twelve by twelve and a half inches in size, for the insertion of honey-frames, fig. 3, O O O, and for the accommodation of honey-boxes, fig. 4, N N, which are placed transversely across the hive over this opening, and covered with a square box-cap, fig. 1, B A B.

In rear of hive is inserted a door, fig. 2, V V, six and a half inches from bottom plate, fig. 2, H, and twenty-four by six inches in size.

In front of hive is another door, fig, 1, G, eight by ten inches, perforated underneath lower edge, with an entrance for bees, fig. 1, K. Behind this door, and one-half inch from same, is a partition debarring so large an entrance to hive as afforded by door, and perforated by two holes, fig. 1, L L, two by three-eighths inches in size, and one inch each right and left of center of hive, and six inches above entrance underneath door. By opening this door, the miller eggs, worms, &c., may be seen and removed.

Suspended transversely across interior of hive, by means of light stripping attached to sides of same, are honey-frames, the position and construction of which are shown in figs. 3, 4, and 5, letters O O O.

Suspended transversely across upper part of hive's interior are two partitions, fig. 4, T T, cutting off two recesses, fig. 4, U U, through which can be suspended additional honey-frames into the space below, and into which can be slid additional honey-boxes by means of the exterior door V V, as shown in fig. 2.

A narrow groove is sawed into the center of sides, front and rear, fig. 3, E E, and from top to bottom of hive, to admit a tin-plate called a separator, fig. 4, P.

The honey-frame, fig. 5, O O O O is that commonly used in hives, and is constructed of four pieces of inch stripping; three of them, the lower pieces, one-quarter inch thick, and the top piece one inch thick and triangular in form. They should be suspended one-half inch apart in hive, and be three-eighths inch from the front and rear sides E E in figs. 3 and 5, and one-half inch from bottom plate H H, fig. 4.

Inside of door V V, fig. 2, and extending between the partitions T T, is a glass door, Q, figs. 2 and 5, six by twelve inches in size.

The uses of the several parts of my invention are the following, to wit:

First. It is rendered moth-proof by means of the double entrances, fig. 1, K and L L, for the moths entering by the door K will immediately deposit their eggs in the interstice between the door G and the interior partition W, it being the habit of the insect to lay their eggs after entering hive around the corners at bottom of same, and they will in no instance crawl up to entrances L L, and so obtain an entrance to the hive.

Secondly. By sliding the tin separator P, figs. 3 and 4, down through center of hive, a part of the bees on either side cut off from their queen will immediately abandon their work, and, making their exit through the doors L L, fig. 1, or the openings for the ventilators I I, fig. 6, which must be removed at such times, rejoin their queen on the opposite side of the separator, thus leaving the comb free from bees, which the operator can remove, together with the honey-boxes, without resorting to smoke or other cruel methods of driving bees.

What I claim as my invention, and desire to secure by Letters Patent, is—

The combination of the lower outer opening in the door and the upper entrance in the side or partition, as and for the purpose set forth.

H. B. COOPER.

Witnesses:
J. PRESTON YOUNG,
JNO. H. FISHER.